(12) United States Patent
Song

(10) Patent No.: US 7,533,882 B2
(45) Date of Patent: May 19, 2009

(54) AUTOMATIC DOCUMENT FEEDER

(75) Inventor: Chi-Jin Song, Taipei (TW)

(73) Assignee: Primax Electronics Ltd., Taipei (TW)

( * ) Notice: Subject to any disclaimer, the term of this patent is extended or adjusted under 35 U.S.C. 154(b) by 311 days.

(21) Appl. No.: 11/549,884

(22) Filed: Oct. 16, 2006

(65) Prior Publication Data

US 2008/0042344 A1 Feb. 21, 2008

(30) Foreign Application Priority Data

Aug. 18, 2006 (TW) .................................. 95130369

(51) Int. Cl.
*B65H 29/00* (2006.01)
(52) U.S. Cl. .................. 271/186; 271/301; 399/374
(58) Field of Classification Search ................ 271/186, 271/65, 301, 291; 399/374
See application file for complete search history.

(56) References Cited

U.S. PATENT DOCUMENTS

| | | | | |
|---|---|---|---|---|
| 5,597,153 A | * | 1/1997 | Maruyama et al. ........... 271/4.1 |
| 5,784,680 A | * | 7/1998 | Taruki .......................... 399/374 |
| 6,081,688 A | * | 6/2000 | Okada et al. ................. 399/374 |
| 6,393,251 B2 | * | 5/2002 | Kono ........................... 399/370 |
| 6,522,860 B2 | * | 2/2003 | Nose et al. ................... 399/374 |
| 6,746,013 B2 | * | 6/2004 | Shih ............................ 271/186 |
| 6,814,353 B1 | * | 11/2004 | Kakuta et al. ................ 271/186 |

* cited by examiner

*Primary Examiner*—Kaitlin S Joerger
(74) *Attorney, Agent, or Firm*—Kirton & McConkie; Evan R. Witt

(57) ABSTRACT

An automatic document feeder includes a sheet input structure, a transfer path, a first guiding path, a second guiding path, a first guiding unit including first and second guiding strips, a second guiding unit, first and second temporary receiving paths and five roller assemblies. A first end of the first guiding strip is pivotally coupled to the position between the first guiding path and the second guiding path. A second end of the first guiding strip is sustained against the second guiding strip under the first guiding strip. A document is transported from the second guiding path into a first temporary receiving path or a second temporary receiving path through the upper surface of the second guiding strip. The document received in the first temporary receiving path or the second temporary receiving path is guided by the first guiding strip to be transported into the first guiding path.

11 Claims, 12 Drawing Sheets

AUTOMATIC DOCUMENT FEEDER

FIELD OF THE INVENTION

The present invention relates to an automatic document feeder, and more particularly to an automatic document feeder for performing a duplex scanning operation or a single-side scanning operation on a document.

BACKGROUND OF THE INVENTION

Image capturing apparatuses such as image scanners, copiers or printers are widely used for capturing or scanning images of documents, photographs or films. As known, the image capturing apparatus usually has an automatic document feeder for automatically and continuously feeding many paper sheets one by one, thereby performing a single-side scanning operation or a duplex scanning operation on the paper sheets fed when the automatic document feeder is operated in a single-side or duplex scanning mode. For enhancing convenience and user-friendliness, these paper sheets are stacked on the ejecting tray in the same order as that of the original stack after the scanning operation.

Referring to FIG. 1, a cross-sectional view of a conventional automatic document feeder is schematically illustrated. Such automatic document feeder is disclosed in for example U.S. Pat. No. 5,784,680, and the contents of which are hereby incorporated by reference. The automatic document feeder 10 of FIG. 1 comprises seven roller assemblies 11~17, an sheet input tray 18, an ejecting tray 19, a switching guide rod 110, a first transfer path 111, a second transfer path 112, an inclining guide path 113, a guiding plate 114, a switch-back path 115 and an inverting path 116. The first roller assembly 11 includes a pick-up roller. The second roller assembly 12 includes a pair of separating rollers. Each of the third roller assembly 13, the fourth roller assembly 14, the fifth roller assembly 15 and the seventh roller assembly 17 includes a driving roller and a follower roller. The sixth roller assembly 16 includes an ejecting roller 161, a first follower roller 162 and a second follower roller 163. In addition, several image sensing controllers S11~S15 are used to detect the location of the paper sheet and control the rotational direction of corresponding roller assembly. The locations and operating principles of these image sensing controllers S11~S15 are well-known in the art, and are not redundantly described herein.

In addition, a scanning module including a slit glass 31, a reflective mirror 32, an exposing lamp 33 and an image sensing controller (not shown) is disposed under the automatic document feeder 10. An exemplary image sensing controller includes a charge couple device (CCD) or a contact image sensor (CIS). When the document to be scanned is transported across the scan region above the scanning module by the automatic document feeder 10, the scanning module scans the document. During the scanning process, the light emitted by the exposing lamp 33 is projected onto the document to be scanned. The light reflected from the document is then transmitted into the optical scanning module through the slit glass 31. After passing through the slit glass 31, the light is successively reflected by the reflective mirror 32, and then focused by an optical lens (not shown). The focused light is then imaged onto the image sensing controller to convert the optical signals reflected from the scanned document into corresponding image signals. The detailed principle of scanning the document by the scanning module is known in the art, and is not redundantly described herein.

Hereinafter, the procedure of performing a duplex scanning operation by the automatic document feeder 10 is illustrated. It is noted that, however, those skilled in the art will readily observe that the procedure of performing a single-side scanning operation will be deduced from the teachings associated with the duplex scanning operation.

First of all, a stack of paper sheets P to be scanned are placed on the sheet input tray 18. Then, a first paper sheet P is picked by the pick-up roller 18, and transported into the first transfer path 111 by the separating roller assembly 12 and the third roller assembly 13. Next, the fourth roller assembly 14, which is disposed at the first transfer path 111, transports the first paper sheet P forwardly to the scan region above the scanning module. When the first paper sheet P is transported across the scan region, the scanning module will scan a first side of the first paper sheet P. Next, the inclining guide path 113 leads the first paper sheet P to the second transfer path 112. Next, the fifth roller assembly 15, which is disposed at the second transfer path 112, transports the first paper sheet P into the gap between the ejecting roller 161 and the first follower roller 162.

At this moment, the switching guide rod 110 is located at a first guiding position as indicated by the dotted line. Next, the first paper sheet P is guided by the switching guide rod 110 and transported forwardly by the ejecting roller 161 and the first follower roller 162 of the sixth roller assembly 16. Next, the seventh roller assembly 17 transports the first paper sheet P into the switch-back path 115, which is defined by the guiding plate 114 and other structure of the automatic document feeder 10. After the majority of the first paper sheet P has been detached from the switching guide rod 110, the switching guide rod 110 is switched to a second guiding position as indicated by the solid line. Then, the seventh roller assembly 17 is reversely rotated to transport the first paper sheet P in the reverse direction. Next, the first paper sheet P is guided by the switching guide rod 110 and transported by the ejecting roller 161 and the second follower roller 163 of the sixth roller assembly 16 into the inverting path 116. Next, the fourth roller assembly 14 transports the first paper sheet P to the scan region through the first transfer path 111. When the first paper sheet P is transported across the scan region, the scanning module scans a second side of the first paper sheet P. For a purpose of ejecting the stack of paper sheets P to the ejecting tray 19 in the same order as that of the original stack, the switching guide rod 110 is switched to the first guiding position again and the first paper sheet P is transported into the switch-back path 115. Next, the switching guide rod 110 is switched to a second guiding position and the seventh roller assembly 17 is reversely rotated to transport the first paper sheet P in the reverse direction. Then, the first paper sheet P is transported into the inverting path 116, the first transfer path 111 and the scan region again. When the first paper sheet P passes through the scan region for the third time, the scanning module does not scan the first paper sheet P. Next, the switching guide rod 110 is switched to the second guiding position and the fifth roller assembly 15 transports the first paper sheet P into the gap between the ejecting roller 161 and the first follower roller 162. Afterwards, the first paper sheet P is transported to the ejecting tray 19. The remainder paper sheets P on the sheet input tray 18 successively implement the duplex scanning operations identical to that for the first paper sheet P. As a consequence, the paper sheets P are stacked in the ejecting tray 19 in the same order as that of the original stack.

However, the process of performing the duplex scanning operation has several drawbacks. As previously described, after the seventh roller assembly 17 is reversely rotated to transport the paper sheet P in the reverse direction, the leading edge of the paper sheet P is successively transported across the inverting path 116, the first transfer path 111, the inclining guide path 113 and the second transfer path 112. If the length of the paper sheet P is too large, the tail edge of the paper sheet P may not be fully separated from the switch-back path 115. When the leading edge of the paper sheet P is transported into the switch-back path 115, the tail edge of the paper sheet P is possibly in contact with the leading edge thereof. Therefore, the paper sheet P is readily jammed in the vicinity of the switching guide rod 110.

In views of the above-described disadvantages resulted from the prior art, the applicant keeps on carving unflaggingly to develop an improved automatic document feeder according to the present invention through wholehearted experience and research.

SUMMARY OF THE INVENTION

It is an object of the present invention to provide an automatic document feeder for performing a duplex scanning operation or a single-side scanning operation on a document very well, regardless of the document's length.

In accordance with a first aspect of the present invention, there is provided an automatic document feeder. The automatic document feeder includes a sheet input structure, a transfer path, a first guiding path, a second guiding path, first and second temporary receiving paths, a first guiding unit and a second guiding unit. A document is placed on the sheet input structure. The transfer path includes a sheet input port, a sheet ejecting port and a scan region. The sheet input port is communicated with the sheet input structure. The first guiding path has a first port connected to the transfer path by a first junction. The second guiding path has a first port connected to the transfer path by a second junction. The first and second temporary receiving paths are arranged adjacent to a second port of the first guiding path and a second port of the second guiding path for temporarily receiving the document. The document which is received in the first temporary receiving path or the second temporary receiving path is transported into the first guiding path with a first surface of the document facing to a first direction or a second direction, wherein the second direction is opposed to the first surface. The first guiding unit is arranged adjacent to the second port of the first guiding path and the second port of the second guiding path and disposed between the first temporary receiving path and the second temporary receiving path. The first guiding unit includes a first guiding strip and a second guiding strip and selectively switched between a first position and a second position to have the first temporary receiving path or the second temporary receiving path communicated with the first guiding path and the second guiding path. A first end of the first guiding strip is pivotally coupled to the position between the second port of the first guiding path and the second port of the second guiding path. A second end of the first guiding strip is sustained against the second guiding strip under the first guiding strip and synchronously shifted with the second guiding strip. The document in the second guiding path is guided by the second guiding strip to be transported into the first temporary receiving path or the second temporary receiving path, and the document received in the first temporary receiving path or the second temporary receiving path is guided by the first guiding strip to be transported into the first guiding path. The second guiding unit is pivotally coupled to the second junction and selectively switched to render or interrupt communication between the second guiding path and the transfer path such that the document passing through the scan region is transported into the second guiding path or transported to the sheet ejecting port.

In an embodiment, a first end of the second guiding strip is pivotally coupled to the position under the second port of the second guiding path such that the second end of the first guiding strip is sustained against the second guiding strip, and a second end of the second guiding strip is selectively communicated with the first temporary receiving path or the second temporary receiving path.

In an embodiment, a first end of the second guiding unit is pivotally coupled to the second junction. The document passing through the scan region is guided by the upper surface of the second guiding unit into the second guiding path when a second end of the second guiding unit is switched to render communication between the second guiding path and the transfer path. The document passing through the scan region is guided by the lower surface of the second guiding unit to the sheet ejecting port when the second end of the second guiding unit is switched to interrupt communication between the second guiding path and the transfer path.

Preferably, the automatic document feeder includes first, second and third image sensing controllers located at corresponding path.

In an embodiment, the document is transported from the sheet input port to the sheet ejecting port through the transfer path and the scan region when the second guiding unit is switched to interrupt communication between the second guiding path and the transfer path in a case that the automatic document feeder is operated in a single-side scanning mode. A single scanning operation is done when the document is transported across the scan region.

Preferably, each of the first, third, forth and fifth roller assemblies includes a driving roller and a follower roller arranged on opposite sides of corresponding path.

In accordance with a second aspect of the present invention, there is provided an automatic document feeder. The automatic document feeder includes a sheet input structure, a transfer path, a first guiding path and a second guiding path, a first guiding unit, and a second guiding unit. A document is placed on the sheet input structure. The transfer path includes a sheet input port, a sheet ejecting port and a scan region. The sheet input port is communicated with the sheet input structure. The first guiding path and the second guiding path have respective first ports connected to the transfer path by a first junction and a second junction, respectively. The document passing through the scan region is transported into the transfer path again though the first and second guiding paths. The first guiding unit is arranged adjacent to the second port of the first guiding path and the second port of the second guiding path and disposed between a first temporary receiving path and a second temporary receiving path. The first guiding unit is selectively switched between a first position and a second position to have the first temporary receiving path or the second temporary receiving path communicated with the first guiding path and the second guiding path. The document in the second guiding path is guided by the first guiding unit to be transported into the first temporary receiving path. The document received in the first temporary receiving path is guided by the first guiding unit to be transported into the first guiding path when the first guiding unit is switched to the first position to have the first temporary receiving path communicated with the first guiding path and the second guiding path. The document in the second guiding path is guided by the first guiding unit to be transported into the second temporary receiving path, and the document received in the second temporary receiving path is guided by the first guiding unit to be transported into the first guiding path when the first guiding unit is switched to the first position to have the second temporary receiving path communicated with the first guiding path and the second guiding path. The second guiding unit is pivotally coupled to the second junction and selectively switched to render or interrupt communication between the second guiding path and the transfer path such that the document passing through the scan region is transported into the second guiding path or transported to the sheet ejecting port.

In accordance with a third aspect of the present invention, there is provided an automatic document feeder. The automatic document feeder includes a sheet input structure, a sheet feeding path, a sheet ejecting path and a first guiding unit. A document is placed on the sheet input structure. The sheet feeding path includes a first port communicated with the sheet input structure and a second port connected to a turning path by a first junction. The document is transported across a scan region through the first port of the sheet feeding path and the first junction with a first surface of the document facing to a first direction. The turning path has an entrance and an exit, and the scan region is arranged between the entrance and the exit of the turning path. The sheet ejecting path is connected to the turning path by a second junction, wherein the document is transported into the sheet ejecting path through the second junction. The first guiding unit is arranged adjacent to the entrance and the exit of the turning path, a first temporary receiving path and a second temporary receiving path. The first guiding unit is selectively switched between a first position and a second position to have the first temporary receiving path or the second temporary receiving path communicated with the turning path. The document is guided by the first guiding unit to be transported from the exit of the turning path into the first temporary receiving path. The document received in the first temporary receiving path is guided by the first guiding unit to be transported into the entrance of the turning path with the first surface of the document facing to a second direction through the scan region to the exit of the turning path, wherein the second direction is opposed to the first direction. The document is guided by the first guiding unit to be transported from the exit of the turning path into the second temporary receiving path, and the document received in the second temporary receiving path is guided by the first guiding unit to be transported into the entrance of the turning path with the first surface of the document facing to the first direction to the sheet ejecting path.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

FIGS. 2(a)~2(c), FIGS. 3(a)~3(c) and FIG. 4(a)~4(c) are schematic cross-sectional views illustrating the steps of performing a duplex scanning operation by the automatic document feeder 20 of the present invention. FIGS. 5(a)~5(b) are schematic cross-sectional views illustrating the steps of performing a single-side scanning operation by the automatic document feeder 20.

Figure 2A:
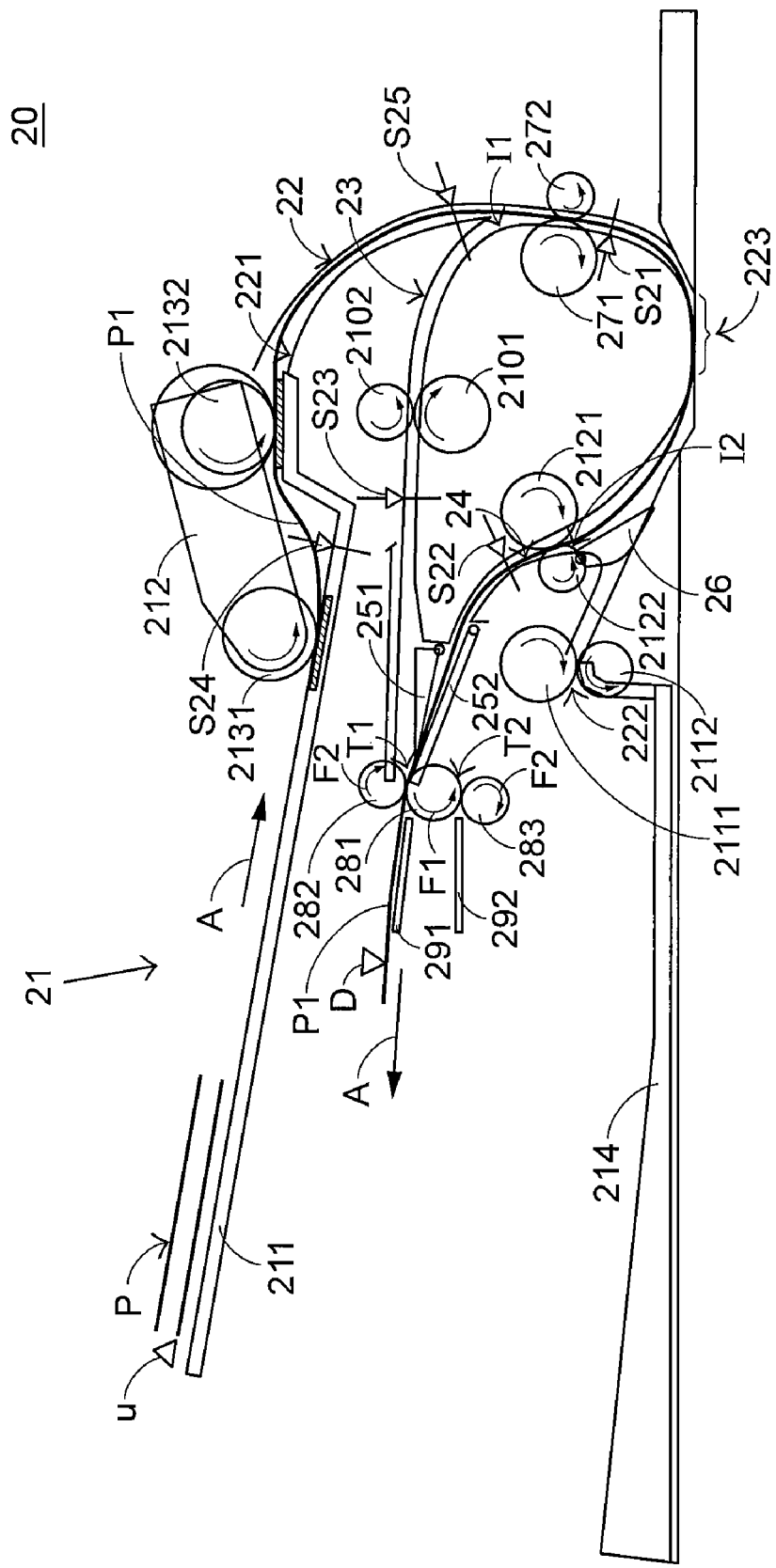
FIGS. 2(a) and 2(b) are schematic cross-sectional views illustrating an automatic document feeder operated in a duplex scanning mode according to a preferred embodiment of the present invention, wherein a first scanning operation is implemented.

Referring to FIG. 2(a), the document to be scanned is transported across the scan region for the first time when the automatic document feeder 20 is operated in the duplex scanning mode. The automatic document feeder 20 as shown in FIG. 2(a) comprises a sheet input structure 21, a transfer path 22, a first guiding path 23, a second guiding path 24, a first guiding unit 25 including a first guiding strip 251 and a second guiding strip 252, a second guiding unit 26, a first temporary receiving path T1, a second temporary receiving path T2, a first roller assembly including a pair of rollers 271 and 272, a second roller assembly including three rollers 281, 282 and 283, a third roller assembly including a pair of rollers 2101 and 2102, a fourth roller assembly including a pair of rollers 2111 and 2112, a fifth roller assembly including a pair of rollers 2121 and 2122, and several image sensing controllers S21~S25.

Figure 1:
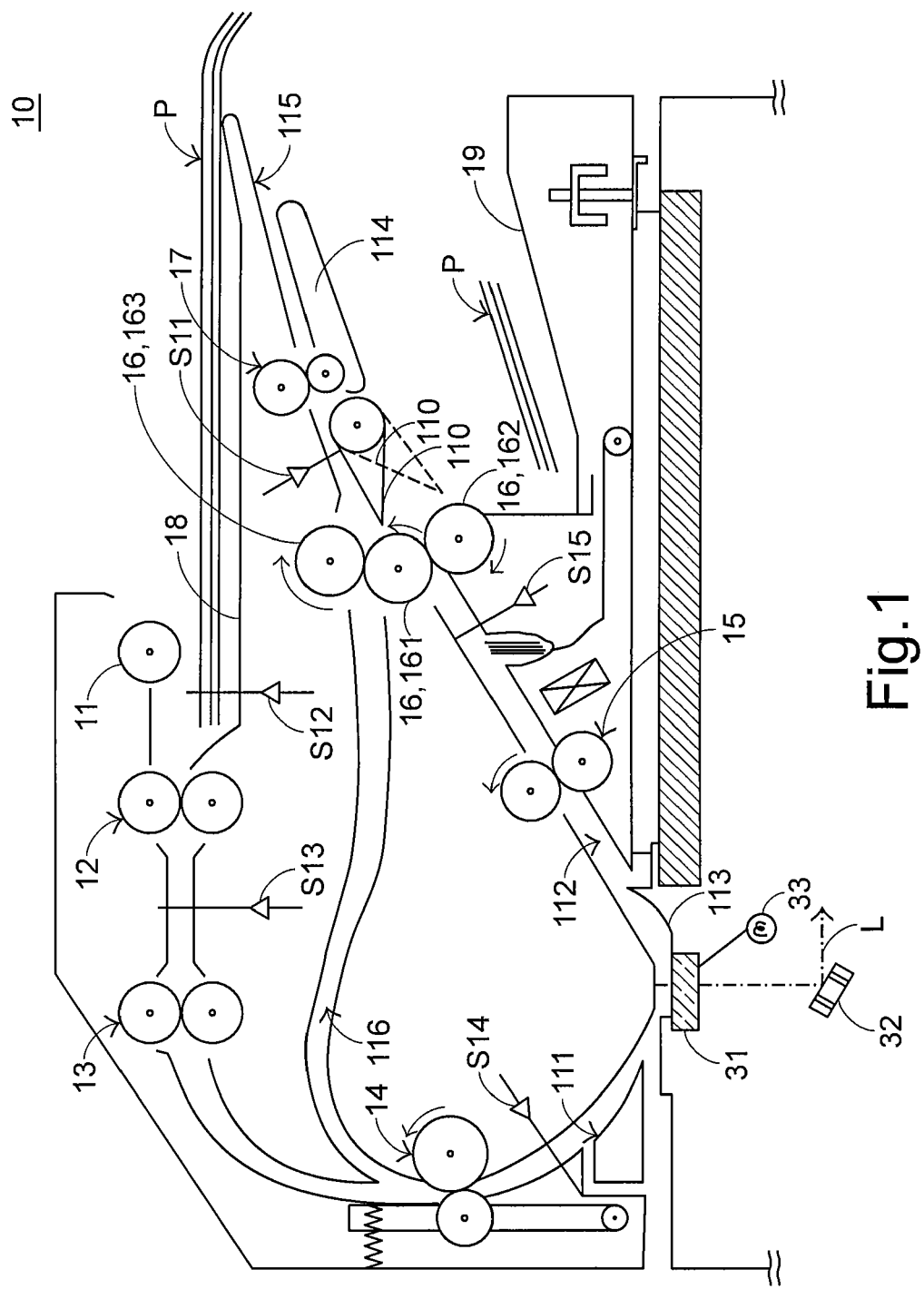
FIG. 1 is a schematic cross-sectional view of a conventional automatic document feeder.

The sheet input structure 21 further includes a sheet input tray 211, a pick-up arm 212, a pick-up roller 2131, a separating roller 2132, and an ejecting tray 214. The pick-up roller 2131 and the separating roller 2132 are disposed at bilateral sides of the pick-up arm 212. The transfer path 22 includes a sheet input port 221, a sheet ejecting port 222 and a scan region 223. The sheet input port 221 is communicated with the sheet input structure 21. Likewise, a scanning module as described in FIG. 1 is disposed under the scan region 223 for performing a scanning operation on the document which is transported across the scan region 223.

A first port of the first guiding path 23 is connected to the transfer path 22 by a first junction I1. A first port of the second guiding path 24 is connected to the transfer path 22 by a second junction I2. The second ports of the first guiding path 23 and the second guiding path 24 are arranged adjacent to each other, as is shown in the drawings. Alternatively, the second ports of the first guiding path 23 and the second guiding path 24 may be distant from each other.

In this embodiment, a first end of the first guiding strip 251 is pivotally coupled to the position between the second ports of the first guiding path 23 and the second guiding path 24. A second end of the first guiding strip 251 is sustained against the second guiding strip 252, which is disposed under the first guiding strip 251. A first end of the second guiding strip 252 is pivotally coupled to the position under the second port of the second guiding path 24. Under the control of the image sensing controllers S22 and S23, the second end of the second guiding strip 252 is switched between a first position and a second position to drive upward and downward shifts of the first guiding strip 251. When the second end of the second guiding strip 252 is switched to the first position, the first guiding path 23 and the second guiding path 24 are communicated with the first temporary receiving path T1. Whereas, when the second end of the second guiding strip 252 is switched to the second position, the first guiding path 23 and the second guiding path 24 are communicated with the second temporary receiving path T2. The second guiding unit 26 is pivotally coupled to the second junction I2. Under the control of the image sensing controllers S21 and S22, the second guiding unit 26 is selectively switched to render or interrupt communication between the second guiding path 24 and the transfer path 22. An exemplary second guiding unit 26 is also a guiding strip. The principles of controlling the guiding strips 251, 252 and 26 by the image sensing controllers S21, S22 and S23 will be illustrated as follows.

In the embodiment of the second roller assembly, the roller 281 is a driving roller, and the rollers 282 and 283 are follower rollers. The gap between the driving roller 281 and the follower roller 282 is defined as the first temporary receiving path T1. The gap between the driving roller 281 and the follower roller 283 is defined as the second temporary receiving path T2. In some embodiments, a first temporary receiving tray 291 and a second temporary receiving tray 292 are provided at the other sides of the first temporary receiving path T1 and the second temporary receiving path T2, respectively, for supporting the document passing therethrough.

The rollers 271, 2101, 2111 and 2121 of the first, third, fourth and fifth roller assemblies are driving rollers. The rollers 272, 2102, 2112 and 2122 of the first, third, fourth and fifth roller assemblies are follower rollers. The locations and operating principles of these image sensing controllers S21~S25 are well-known in the art, and are not redundantly described herein.

In accordance with the present invention, the passageway from the sheet input port 221 to the first junction I1 is defined as a sheet feeding path. The passageway from the second junction I2 to the sheet ejecting port 222 is defined as a sheet ejecting path. In an embodiment, the first guiding path 23, the second guiding path 24 and the transfer path 22 from the first junction I1 to the second junction I2 are defined as a turning path including an entrance and an exit. The scan region 223 is arranged between the first junction I1 and the second junction I2. The entrance of the turning path is substantially located at the exit of the first guiding path 23, and the exit of the turning path is substantially located at the exit of the second guiding path 24. It is noted that, however, those skilled in the art will readily observe that numerous modifications and alterations of the automatic document feeder may be made while retaining the teachings of the invention. Accordingly, the above disclosure should be limited only by the bounds of the following claims.

Figure 2B:
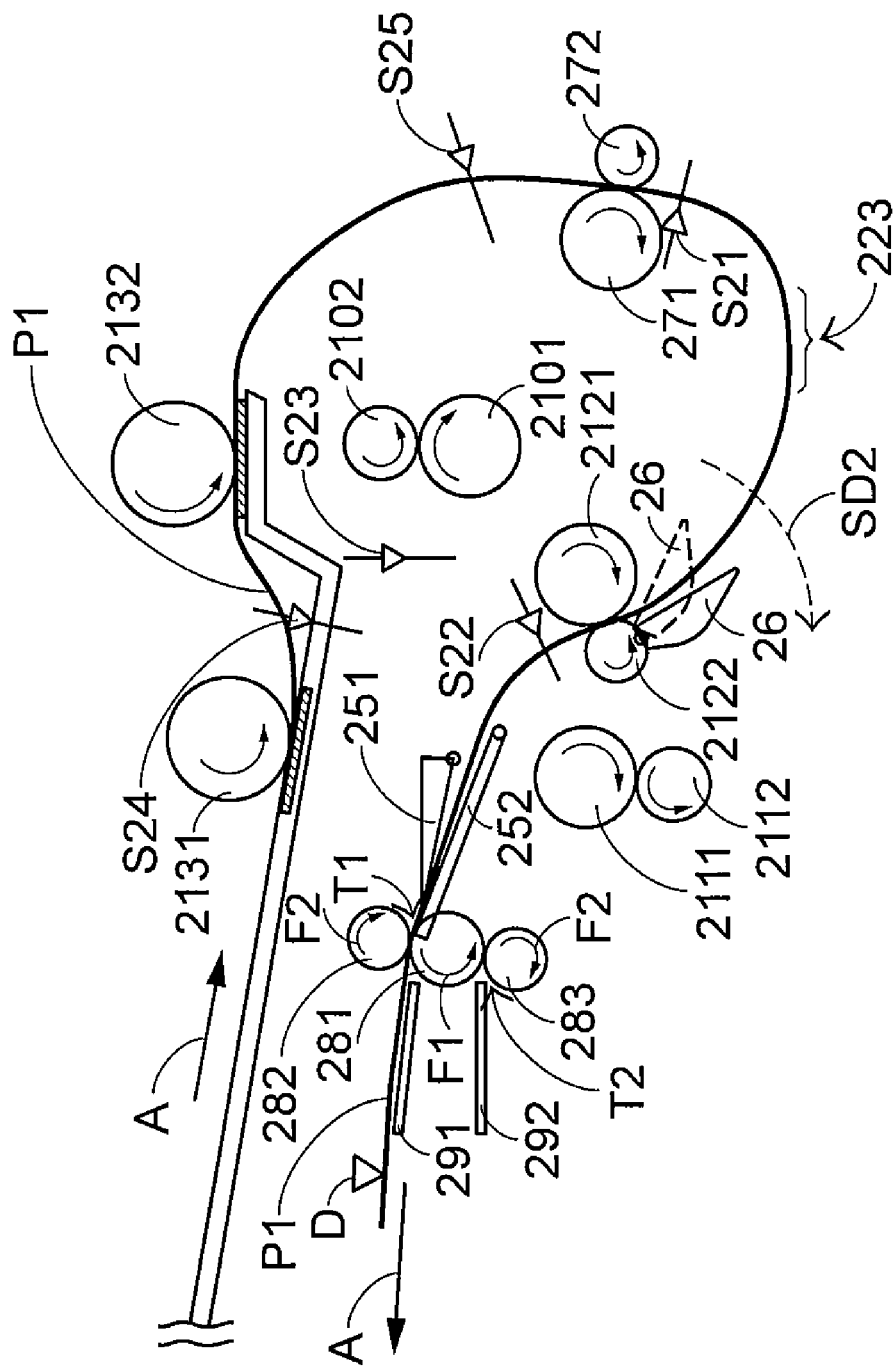

Hereinafter, the procedure of performing the duplex scanning operation by the automatic document feeder 200 is illustrated in FIG. 2(a). In FIG. 2(b), some components shown in FIG. 2(a) are omitted for clarification. First of all, a stack of paper sheets P to be scanned are placed on the sheet input tray 211, wherein the first sides of the paper sheets P are faced upwardly as indicated in the direction U. Next, by the pick-up roller 2131 and the separating roller 2132, a first paper sheet P1 is transported to the first junction I1 in the direction A. Next, the rollers 271 and 272 of the first roller assembly transport the first paper sheet P1 forwardly toward the scan region 223 above the scanning module. When the image sensing controller S21 detects the presence of the first paper sheet P1, the second guiding unit 26 is rotated clockwise (in the direction SD2) such that the transfer path 22 is communicated with the second guiding path 24. When the first paper sheet P1 is transported across the scan region 223, the scanning module will perform a scanning operation on the first side of the first paper sheet P1, which is faced downwardly as indicated in the direction D. Next, the first paper sheet P1 is guided by the upper surface of the second guiding unit 26 and transported to the second guiding path 24. Next, the second end of the second guiding strip 252 is switched to the first position, and thus the first guiding path 23 and the second guiding path 24 are communicated with the first temporary receiving path T1. Meanwhile, the driving roller 281 is rotated anti-clockwise in the direction F1 to drive clockwise rotation F2 of the follower roller 282. Next, the rollers 2121 and 2122 of the fifth roller assembly transport the first paper sheet P1 forwardly through the second guiding path 24. After the leading edge of the first paper sheet P1 uplifts the first guiding strip 251, the first paper sheet P1 is nipped between the driving roller 281 and the follower roller 282 to be transport through the first temporary receiving path T1.

Figure 2C:
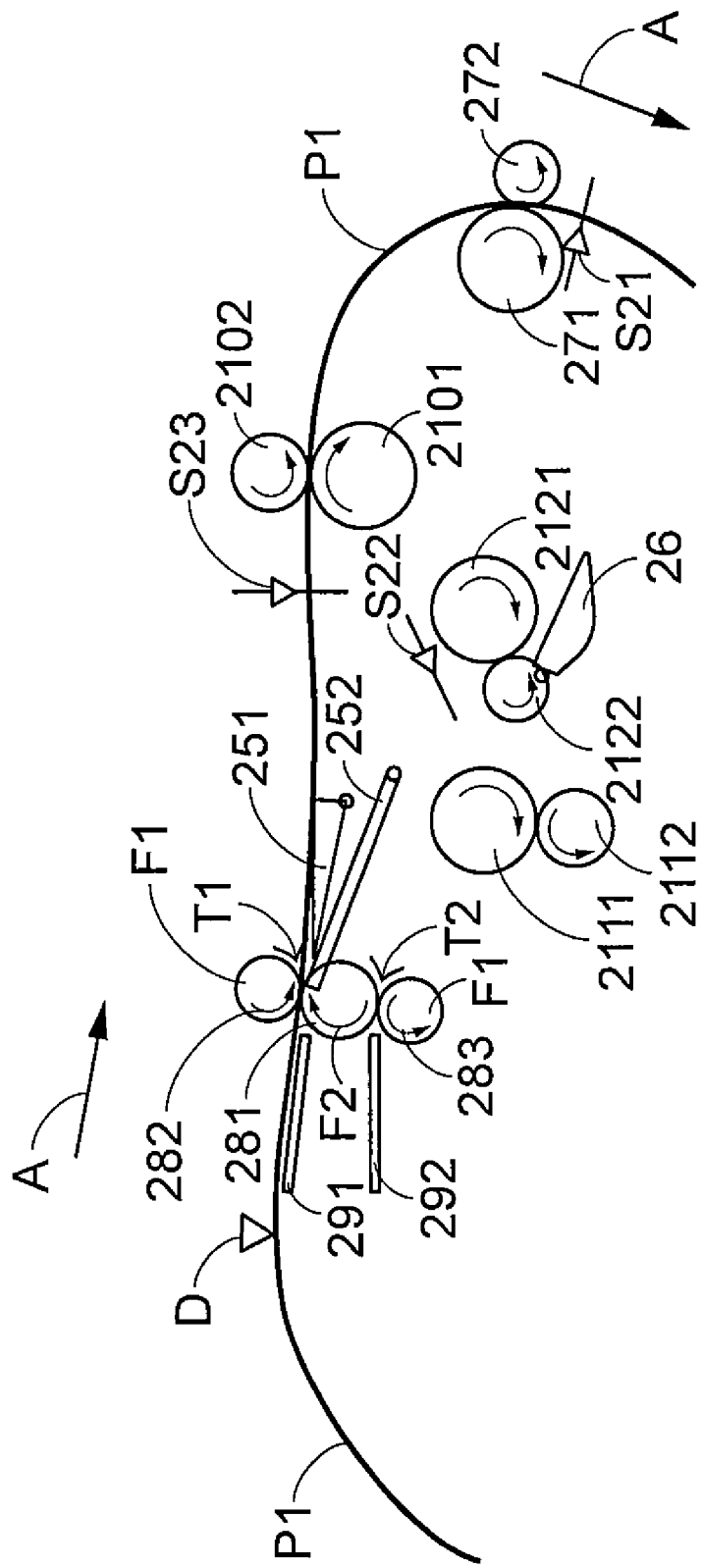
FIG. 2(c) is a schematic cross-sectional view illustrating that the first paper sheet P1 transported from the first temporary receiving path T1 to the first guiding path 23.

Please refer to FIG. 2(c), which schematically illustrates that the first paper sheet P1 is transported from the first temporary receiving path T1 to the first guiding path 23. After the tail edge of the first paper sheet P1 has left out of the detecting range of the image sensing controller S22 for a predetermined time period, the driving roller 281 is reversely rotated in the clockwise direction F2 to drive anti-clockwise rotation F1 of the follower roller 282, so that the first paper sheet P1 is transported into the first guiding path 23. Next, the rollers 2101 and 2102 of the third roller assembly, which are disposed at the first guiding path 23, transport the first paper sheet P1 into the transfer path 22 through the first junction I1.

Figure 3A:
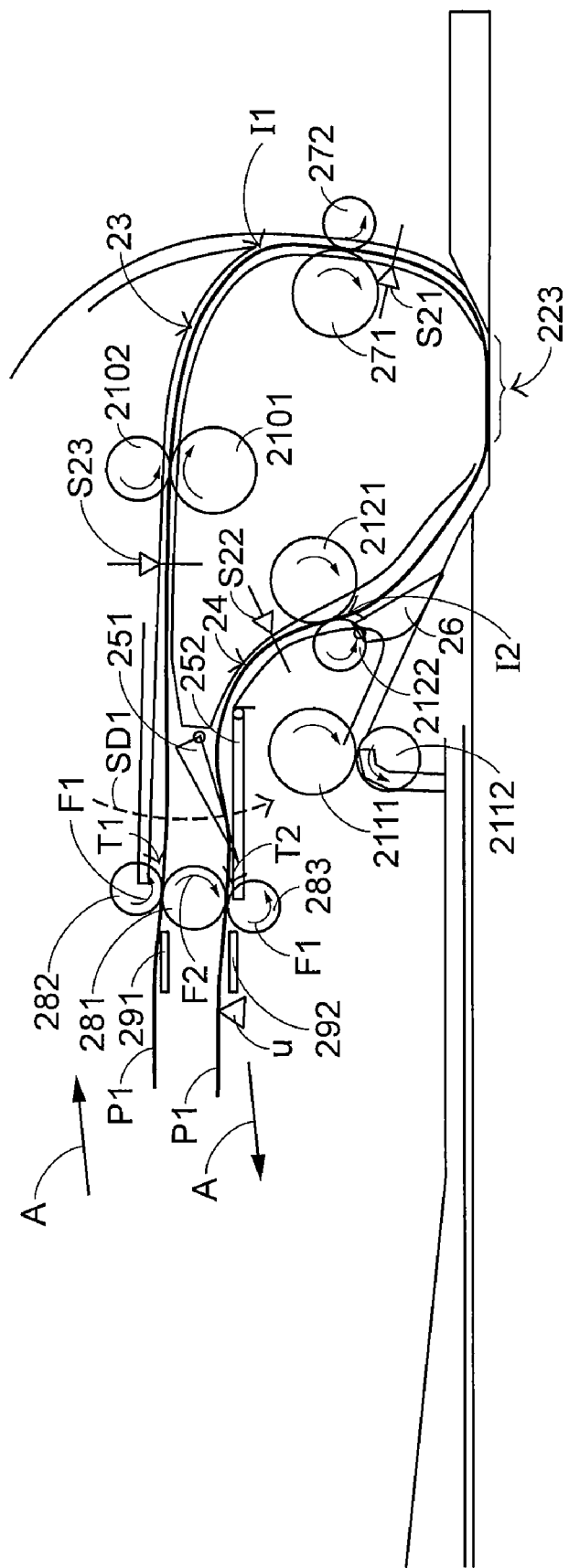
FIGS. 3(a) and 3(b) are schematic cross-sectional views illustrating that the first paper sheet P1 is transported to the second temporary receiving path T2.
Figure 3B:
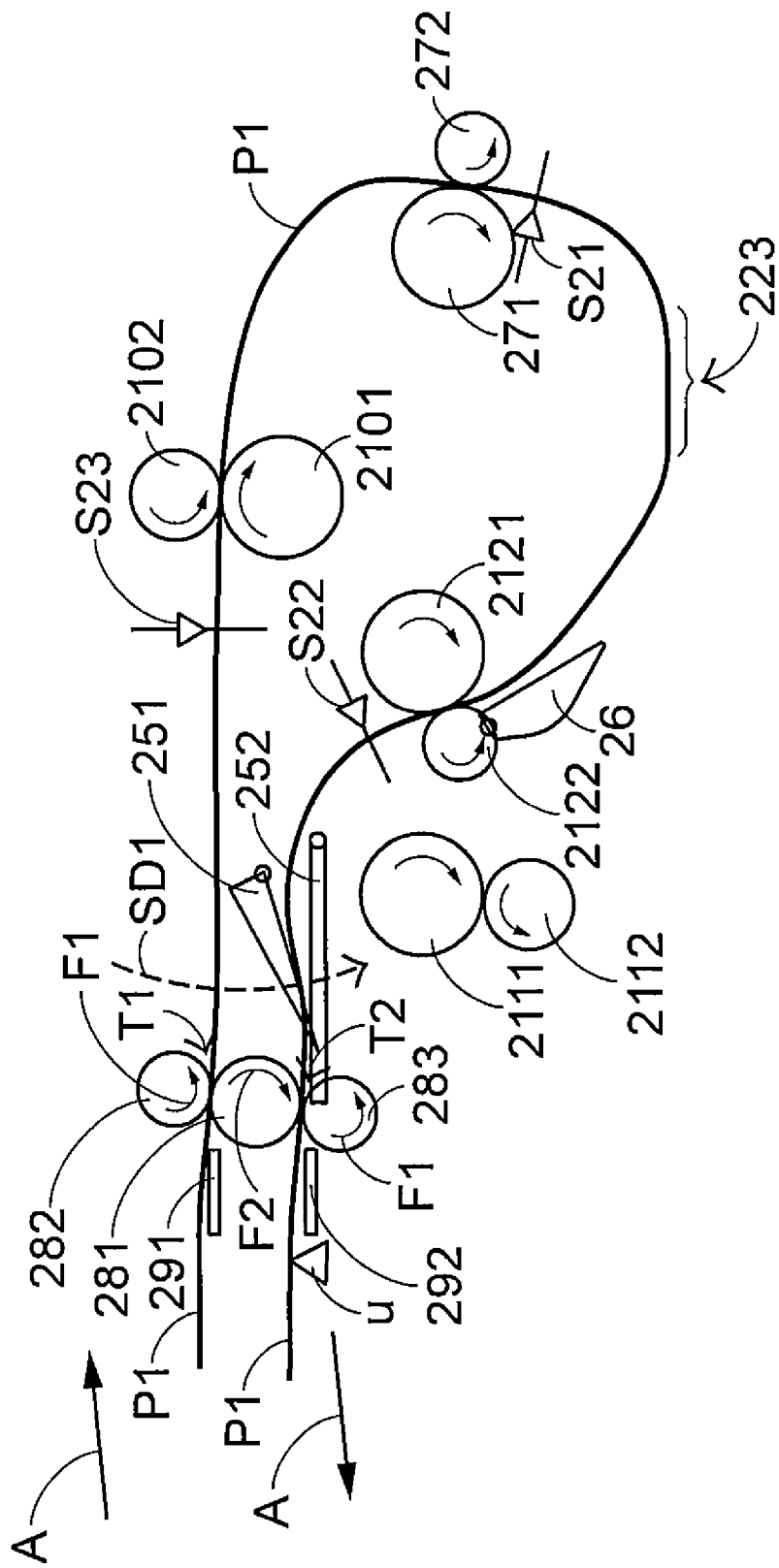
Figure 3C:
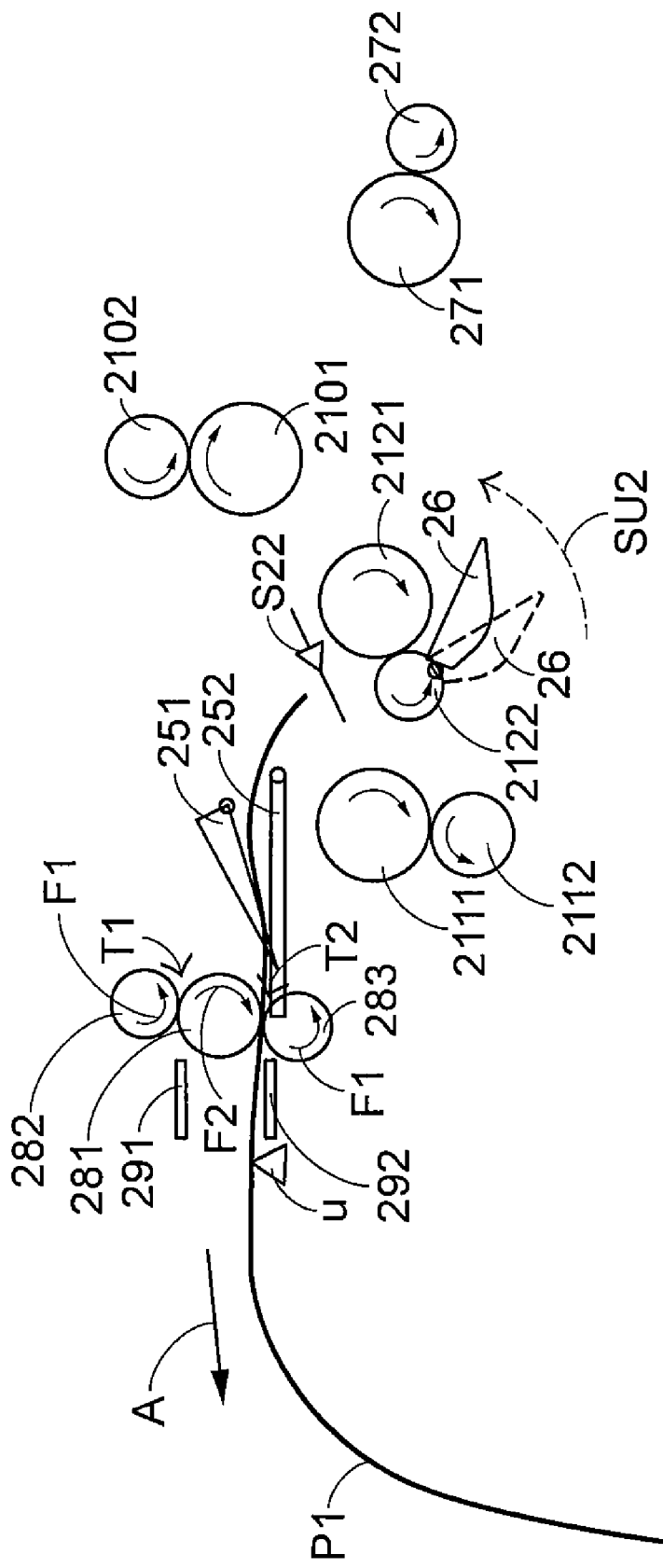
FIG. 3(c) is a schematic cross-sectional view illustrating that the first paper sheet P1 is detached from the second guiding path 24 and then received in the second temporary receiving path T2.

Please refer to FIG. 3(a), which schematically illustrates that the first paper sheet P1 is transported to the second temporary receiving path T2. In FIG. 3(b), some components shown in FIG. 3(a) are omitted for clarification. As shown in FIG. 3(c), the first paper sheet P1 is detached from the second guiding path 24 and received in the second temporary receiving path T2.

As shown in FIGS. 3(a) and 3(b), the first paper sheet P1 is transported through the transfer path 22 to the scan region 223 again. Then, the image sensing controller S21 detects the presence of the first paper sheet P1. When the first paper sheet P1 is transported across the scan region 223, the scanning module will perform a scanning operation on the second side of the first paper sheet P1, wherein the first side of the first paper sheet P1 is faced upwardly as indicated in the direction U. After the image sensing controller S22 has detected the presence of the first paper sheet P1 for a predetermined time period, the first paper sheet P1 is switched to the second position to drive downward shift of the first guiding strip 251 in the direction SD1, and thus the second guiding path 24 is communicated with the second temporary receiving path T2. Meanwhile, the driving roller 281 is rotated clockwise in the direction F2 to drive anti-clockwise rotation F1 of the follower roller 282. After the leading edge of the first paper sheet P1 uplifts the first guiding strip 251, the first paper sheet P1 is nipped between the driving roller 281 and the follower roller 283 to be transport through the second temporary receiving path T2. Please refer to FIGS. 3(a) and 3(b) again. The first temporary receiving path T1 is separated from the temporary receiving path T2. Even if the leading edge of the first paper sheet P1 is transported to the temporary receiving path T2 but the tail edge of the first paper sheet P1 is not fully separated from first temporary receiving path T1, the tail edge of the first paper sheet P1 will not be in contact with the leading edge thereof. Therefore, the problem of causing jammed paper is avoided.

After the tail edge of the first paper sheet P1 has left out of the detecting range of the image sensing controller S22, the second guiding unit 26 is rotated anti-clockwise (in the direction SU2 as shown in FIG. 3(c)) such that the transfer path 22 is not communicated with the second guiding path 24.

Figure 4A:
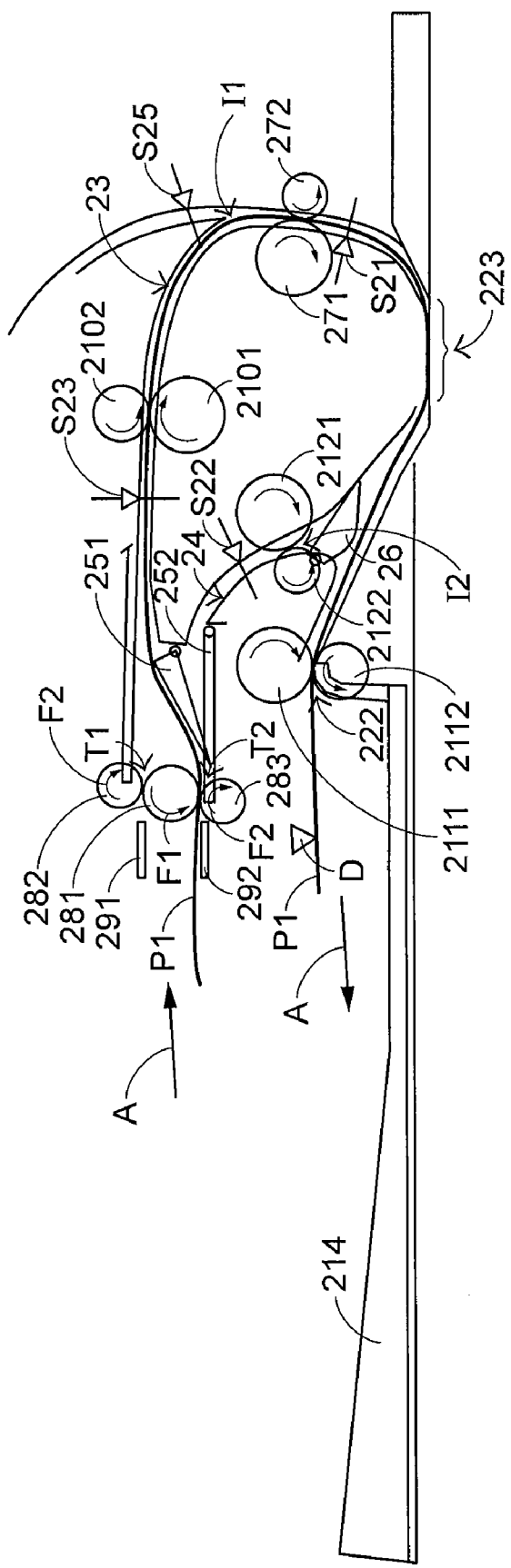
FIGS. 4(a) and 4(b) are schematic cross-sectional views illustrating that the first paper sheet P1 is transported from the second temporary receiving path T2 to the ejecting tray 214 through the first guiding path 23.
Figure 4B:
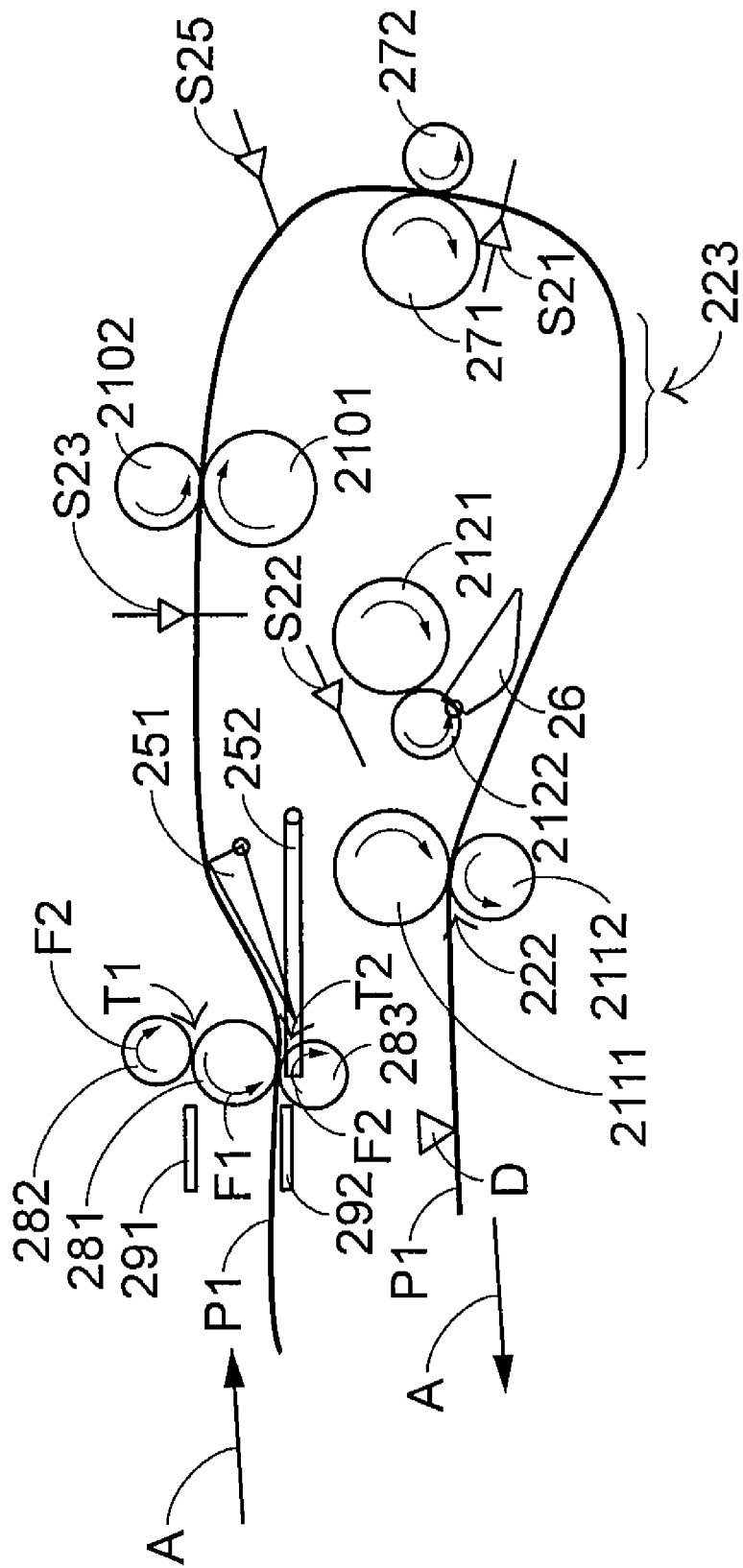
Figure 4C:
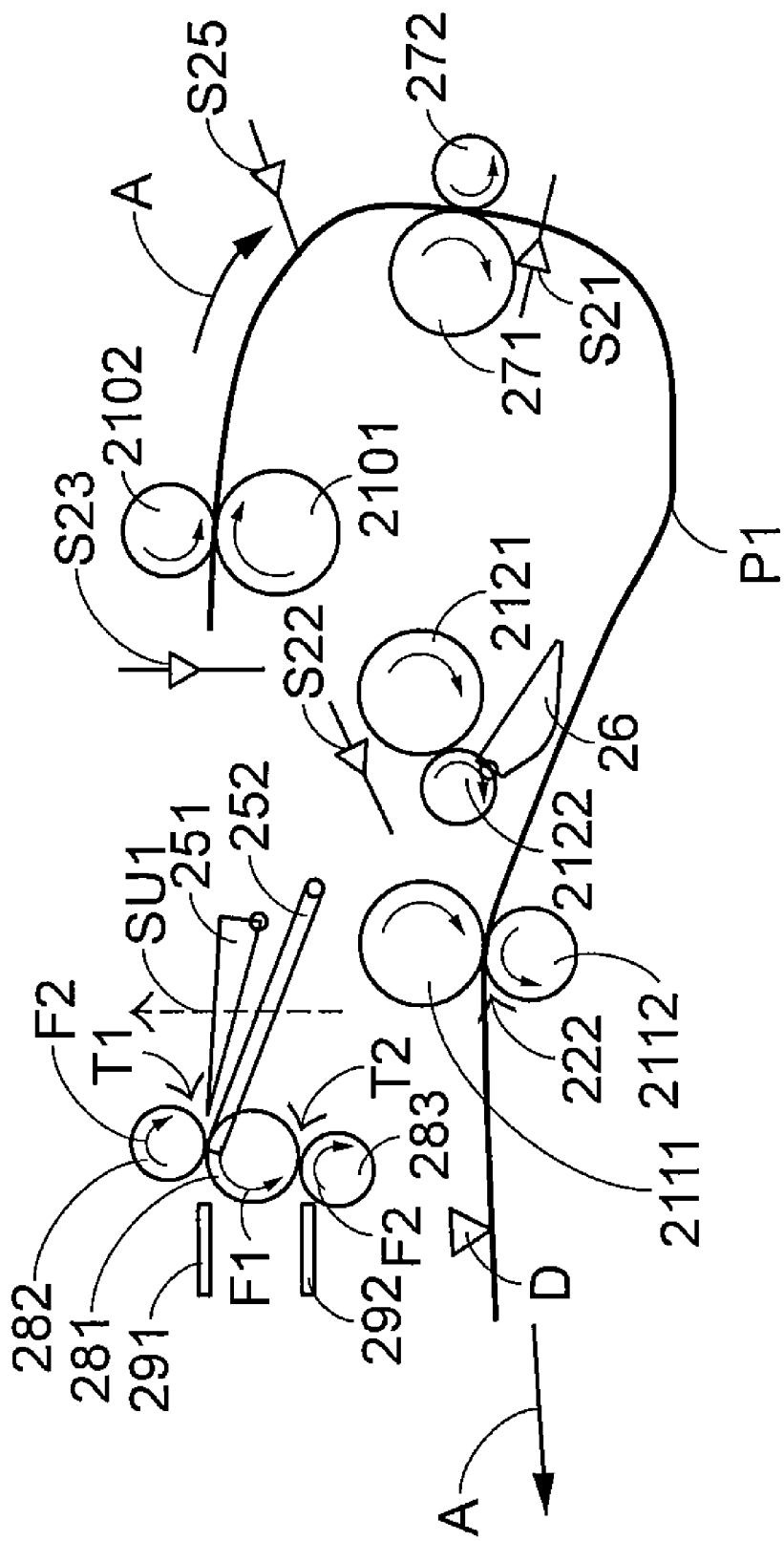
FIG. 4(c) is a schematic cross-sectional view illustrating that a majority of the first paper sheet P1 is transported across the first guiding path 23.
Figure 5A:
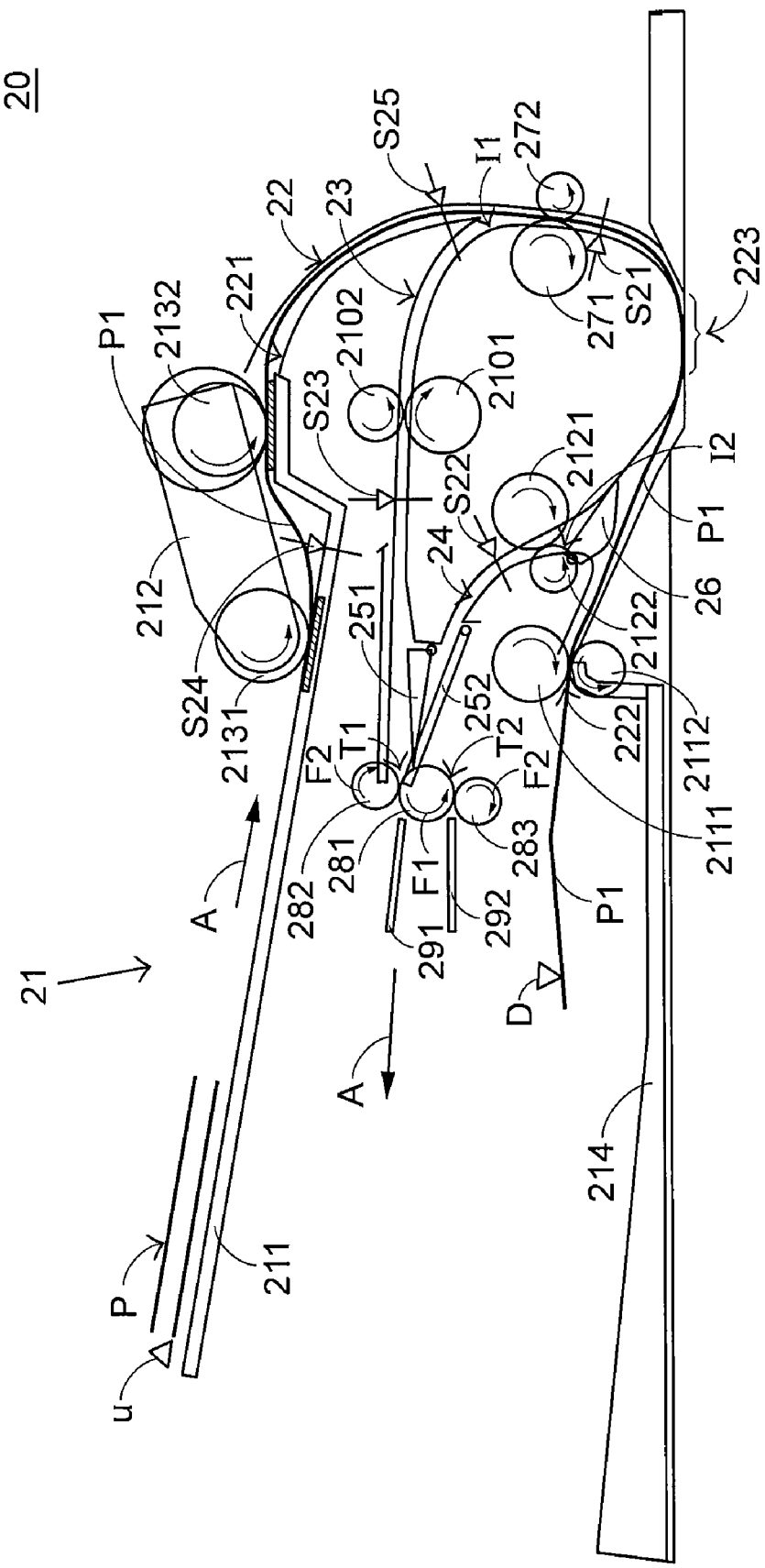
FIGS. 5(a) and 5(b) are schematic cross-sectional views illustrating an automatic document feeder operated in a single-side scanning mode according to a preferred embodiment of the present invention, wherein a scanning operation is implemented.
Figure 5B:
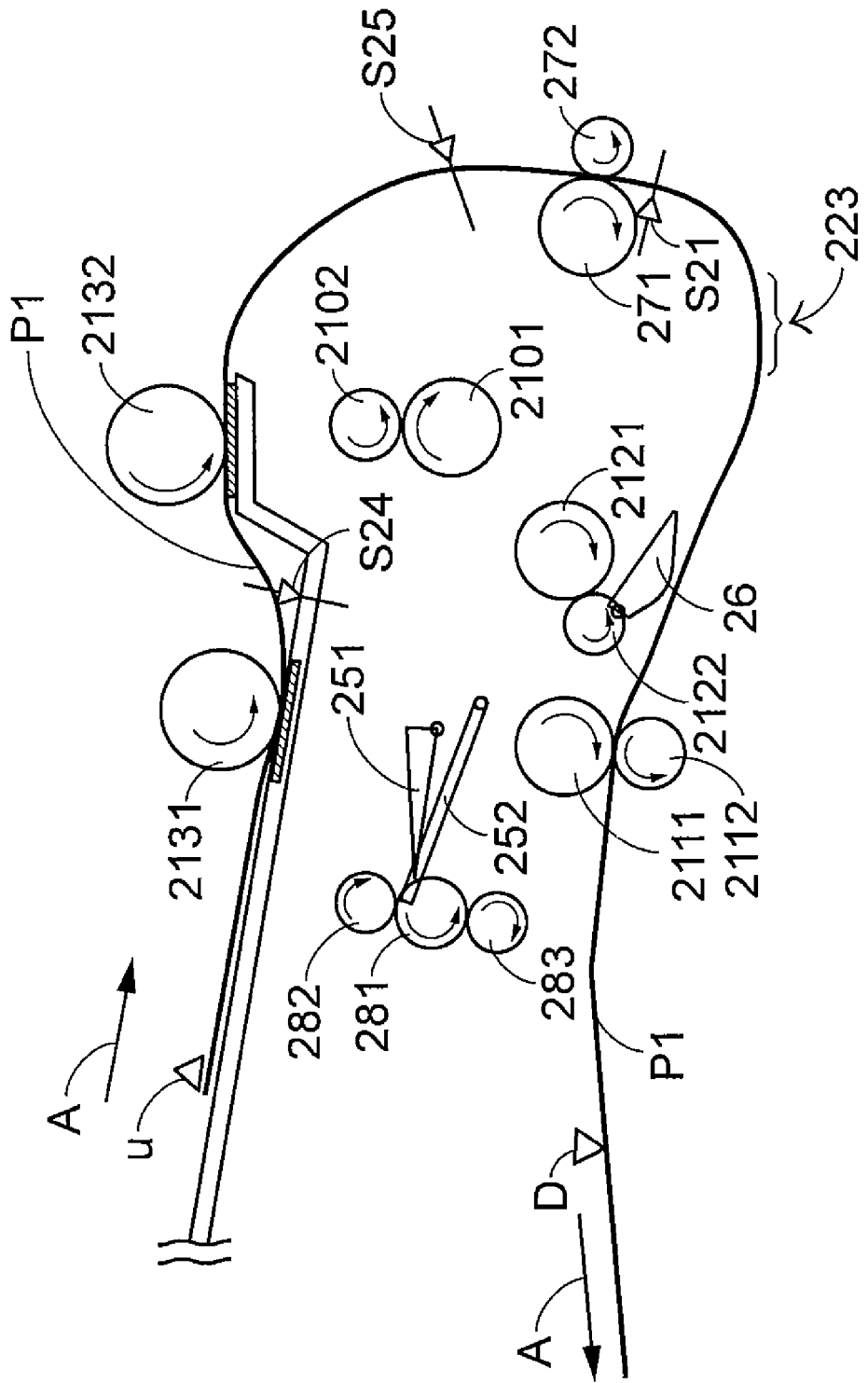

Please refer to FIG. 4(a), which schematically illustrates that the first paper sheet P1 is transported from the second temporary receiving path T2 to the ejecting tray 214 through the first guiding path 23. In FIG. 4(b), some components shown in FIG. 4(a) are omitted for clarification. FIG. 4(c) schematically illustrates that a majority of the first paper sheet P1 is transported across the first guiding path 23.

Please refer to FIGS. 4(a) and 4(b) again. After the tail edge of the first paper sheet P1 has left out of the detecting range of the image sensing controller S22 for a predetermined time period, the driving roller 281 is reversely rotated in the anti-clockwise direction F1 to drive clockwise rotation F2 of the follower roller 282, so that the first paper sheet P1 is transported into the first guiding path 23. Next, the rollers 2101 and 2102 of the third roller assembly, which are disposed at the first guiding path 23, transport the first paper sheet P1 into the transfer path 22 through the first junction I1. Then, the first paper sheet P1 is transported across the scan region 223 for the third time, but the scanning module does not scan the first paper sheet P1. Since the communication between the second guiding path 24 and the transfer path 22 is interrupted at this moment, the first paper sheet P1 will be guided by the lower surface of the second guiding unit 26 to the sheet ejecting port 222. Next, the rollers 2111 and 2112 of the fourth roller assembly transport the first paper sheet P1 to the ejecting tray 214.

Referring to FIG. 4(c), after the tail edge of the first paper sheet P1 has left out of the detecting range of the third image sensing controller S23 in the first guiding path 23 for a predetermined time period, the second end of the second guiding strip 252 is switched to drive upward shift of the first guiding strip 251 in the direction SU1. After the tail edge of the first paper sheet P1 has left out of the detecting range of the fifth image sensing controller S25, the pick-up roller 2131 will pick the next paper sheet. The remainder paper sheets P on the sheet input tray 211 successively implement the duplex scanning operations identical to that for the first paper sheet P1. As a consequence, the paper sheets P are stacked in the ejecting tray 214 in the same order as that of the original stack. Until the fourth image sensing controller S24 detects the absence of any paper sheet, the pick-up roller 2131 stops the picking operation.

Hereinafter, the procedure of performing the single-side scanning operation by the automatic document feeder 200 is illustrated in FIG. 5(a). In FIG. 5(b), some components shown in FIG. 5(a) are omitted for clarification.

The procedure of performing the single-side scanning operation will be deduced from the teachings associated with the duplex scanning operation. In comparison with the duplex scanning as described in FIGS. 2~4, the second guiding unit 26 is no longer switched to render communication between the second guiding path 24 and the transfer path 22. First of all, a first paper sheet P1 is transported into the transfer path 22 through the sheet input port 221 of the sheet input structure 21. Next, the first paper sheet P1 is transported across the scan region 223 such that the scanning module will scan the first paper sheet P1. Likewise, the rollers 271 and 272 of the first roller assembly and the rollers 2111 and 2112 of the fourth roller assembly will transport the first paper sheet P1 to the ejecting tray 214. The remainder paper sheets P on the sheet input tray 211 successively implement the single-side scanning operations identical to that for the first paper sheet P1. As a consequence, the paper sheets P are stacked in the ejecting tray 214 in the same order as that of the original stack.

From the above description, due to the specific structures of the first guiding strip 251, the second guiding strip 252, the first temporary receiving path T1 and the second temporary receiving path T2, the problem of causing jammed paper is avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic document feeder comprising:
   a sheet input structure placing thereon a document;
   a transfer path including a sheet input port, a sheet ejecting port and a scan region, said sheet input port being communicated with said sheet input structure;
   a first guiding path having a first port connected to said transfer path by a first junction;
   a second guiding path having a first port connected to said transfer path by a second junction;
   first and second temporary receiving paths arranged adjacent to a second port of said first guiding path and a second port of said second guiding path for temporarily receiving said document, wherein said document received in said first temporary receiving path or said second temporary receiving path is transported into said first guiding path with a first surface of said document facing to a first direction or a second direction, said second direction being opposed to said first surface;
   a first guiding unit arranged adjacent to said second port of said first guiding path and said second port of said second guiding path and disposed between said first temporary receiving path and said second temporary receiving path, said first guiding unit including a first guiding strip and a second guiding strip and selectively switched between a first position and a second position to have said first temporary receiving path or said second temporary receiving path communicated with said first guiding path and said second guiding path, wherein a first end of the first guiding strip is pivotally coupled to the position between said second port of said first guiding path and said second port of said second guiding path, a second end of said first guiding strip is sustained against said second guiding strip under said first guiding strip and synchronously shifted with said second guiding strip, said document in said second guiding path is guided by said second guiding strip to be transported into said first temporary receiving path or said second temporary receiving path, and said document received in said first temporary receiving path or said second temporary receiving path is guided by said first guiding strip to be transported into said first guiding path, wherein a first end of said second guiding strip is pivotally coupled to the position under said second port of said second guiding path such that said second end of said first guiding strip is sustained against said second guiding strip, and a second end of said second guiding strip is selectively communicated with said first temporary receiving path or said second temporary receiving path; and a second guiding unit pivotally coupled to said second junction and selectively switched to render or interrupt communication between said second guiding path and said transfer path such that said document passing through said scan region is transported into said second guiding path or transported to said sheet ejecting port.

2. The automatic document feeder according to claim 1 wherein a first end of said second guiding unit is pivotally coupled to said second junction, wherein said document passing through said scan region is guided by the upper surface of the second guiding unit into said second guiding path when a second end of said second guiding unit is switched to render communication between said second guiding path and said transfer path, and said document passing through said scan region is guided by the lower surface of said second guiding unit to said sheet ejecting port when said second end of said second guiding unit is switched to interrupt communication between said second guiding path and said transfer path.

3. The automatic document feeder according to claim 2 further comprising:

a first image sensing controller located between said first junction and said scan region for sensing a first side and a second side of said document in a case that said automatic document feeder is operated in a duplex scanning mode to perform first and second scanning operations thereon, and controlling shift of said second end of said second guiding unit to render communication between said second guiding path and said transfer path such that said document performed by said first and second scanning operations is guided by said second guiding unit into said second guiding path;

a second image sensing controller located in said second guiding path for controlling said document, which is transport into said first temporary receiving path through said second guiding path after said first scanning operation, to be reversely transported from said first temporary receiving path into said first guiding path through the upper surface of said first guiding strip with said first surface of said document facing to a direction opposed to the original direction in a case that said automatic document feeder is operated in said duplex scanning mode, or controlling a shift of said second end of said second guiding strip to render communication between said first guiding path, said second guiding path and said second temporary receiving path after said second scanning operation is performed on said document and when said automatic document feeder is operated in said duplex scanning mode, such that said document, which is transported from said second guiding path to said second temporary receiving path through the upper surface of said second guiding strip by uplifting said second end of said first guiding strip, is reversely transported from said second temporary receiving path into said first guiding path through the upper surface of said first guiding strip with said first surface of said document facing to the original direction; and a third image sensing controller located in said first guiding path for controlling a shift of said second end of said second guiding strip to render communication between said first guiding path, said second guiding path and said first temporary receiving path after said document is transported from said second temporary receiving path into said first guiding path in a case that said automatic document feeder is operated in said duplex scanning mode.

4. The automatic document feeder according to claim 3 wherein said second end of said second guiding unit is switched to interrupt communication between said second guiding path and said transfer path under the control of said second image sensing controller when said document is transported into said second temporary receiving tray and before said document is completely detached from said second temporary receiving tray.

5. The automatic document feeder according to claim 4 wherein said document is transported from said sheet input port to said sheet ejecting port through said transfer path and said scan region when said second guiding unit is switched to interrupt communication between said second guiding path and said transfer path in a case that said automatic document feeder is operated in a single-side scanning mode, wherein a single scanning operation is done when said document is transported across said scan region.

6. The automatic document feeder according to claim 1 further comprising:

a first roller assembly located in said transfer path and between said first junction and said scan region for transporting said document from said sheet input port or said first guiding path to said scan region; and a second roller assembly including a first follower roller, a second follower roller and a driving roller between said first follower roller and said second follower roller, wherein a first temporary receiving tray and a first gap between said driving roller and said first follower roller are cooperatively defined as said first temporary receiving path, and a second temporary receiving tray and a second gap between said driving roller and said second follower roller are cooperatively defined as said second temporary receiving path.

7. The automatic document feeder according to claim 6 further comprising:

a third roller assembly located in said first guiding path and cooperated with said second roller assembly to transport said document from said first or second temporary receiving path into said transfer path through the upper surface of said first guiding strip and said first junction;

a fourth roller assembly arranged at said sheet ejecting port and cooperated with said first roller assembly to transport said document passing through said scan region to said sheet ejecting port in the guidance of said second guiding unit when said second end of said second guiding unit is switched to interrupt communication between said second guiding path and said transfer path; and a fifth roller assembly arranged in said second guiding path and cooperated with said first roller assembly to transport said document passing through said scan region into said second guiding path when said second end of said second guiding unit is switched to render communication between said second guiding path and said transfer path.

8. The automatic document feeder according to claim 7 wherein each of said first, third, fourth and fifth roller assemblies includes a driving roller and a follower roller arranged on opposite sides of corresponding path.

9. The automatic document feeder according to claim 1 wherein said first guiding strip of said first guiding unit is a follower strip, said second guiding strip of said first guiding unit and said second guiding unit are driving strips, and said first surface of said document faces upwardly in said first direction and downwardly in said second direction, or said first surface of said document faces downwardly in said first direction and upwardly in said second direction.

10. An automatic document feeder comprising:
a sheet input structure placing thereon a document;
a transfer path including a sheet input port, a sheet ejecting port and a scan region, said sheet input port being communicated with said sheet input structure;
a first guiding path and a second guiding path having respective first ports connected to said transfer path by a first junction and a second junction, respectively, wherein said document passing through said scan region is transported into said transfer path again though said first and second guiding paths;
a first guiding unit arranged adjacent to said second port of said first guiding path and said second port of said second guiding path and disposed between a first temporary receiving path and a second temporary receiving path, said first guiding unit being selectively switched between a first position and a second position to have said first temporary receiving path or said second temporary receiving path communicated with said first guiding path and said second guiding path, wherein said document in said second guiding path is guided by said first guiding unit to be transported into said first temporary receiving path and said document received in said first temporary receiving path is guided by said first guiding unit to be transported into said first guiding path when said first guiding unit is switched to said first position to have said first temporary receiving path communicated with said first guiding path and said second guiding path, wherein said document in said second guiding path is guided by said first guiding unit to be transported into said second temporary receiving path and said document received in said second temporary receiving path is guided by said first guiding unit to be transported into said first guiding path when said first guiding unit is switched to said first position to have said second temporary receiving path communicated with said first guiding path and said second guiding path; and
a second guiding unit pivotally coupled to said second junction and selectively switched to render or interrupt communication between said second guiding path and said transfer path such that said document passing through said scan region is transported into said second guiding path or transported to said sheet ejecting port.

11. An automatic document feeder comprising:
a sheet input structure placing thereon a document;
a sheet feeding path including a first port communicated with said sheet input structure and a second port connected to a turning path by a first junction, wherein said document is transported across a scan region through said first port of said sheet feeding path and said first junction with a first surface of said document facing to a first direction, wherein said turning path has an entrance and an exit, and said scan region is arranged between said entrance and said exit of said turning path;
a sheet ejecting path connected to said turning path by a second junction, wherein said document is transported into said sheet ejecting path through said second junction; and a first guiding unit arranged adjacent to said entrance and said exit of said turning path, a first temporary receiving path and a second temporary receiving path, said first guiding unit being selectively switched between a first position and a second position to have said first temporary receiving path or said second temporary receiving path communicated with said turning path, wherein said document is guided by said first guiding unit to be transported from said exit of said turning path into said first temporary receiving path, and said document received in said first temporary receiving path is guided by said first guiding unit to be transported into said entrance of said turning path with said first surface of said document facing to a second direction through said scan region to said exit of said turning path, said second direction being opposed to said first direction, wherein said document is guided by said first guiding unit to be transported from said exit of said turning path into said second temporary receiving path, and said document received in said second temporary receiving path is guided by said first guiding unit to be transported into said entrance of said turning path with said first surface of said document facing to said first direction to said sheet ejecting path.

* * * * *